V. OVERMYER.
STONE GATHERING MACHINE.
APPLICATION FILED NOV. 9, 1912.
1,057,494.
Patented Apr. 1, 1913.
3 SHEETS—SHEET 1.
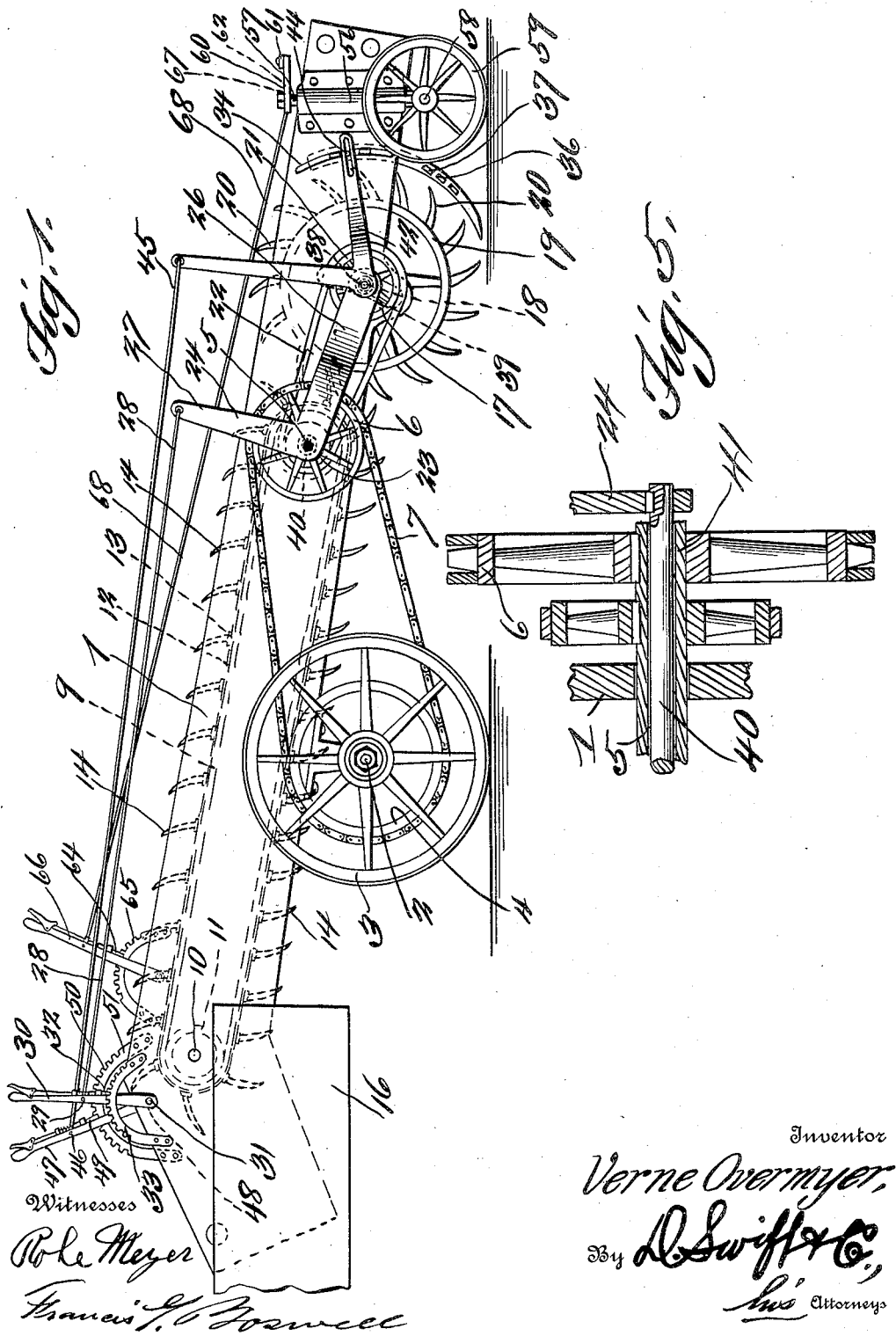

V. OVERMYER.
STONE GATHERING MACHINE.
APPLICATION FILED NOV. 9, 1912.
1,057,494.
Patented Apr. 1, 1913.
3 SHEETS—SHEET 2.
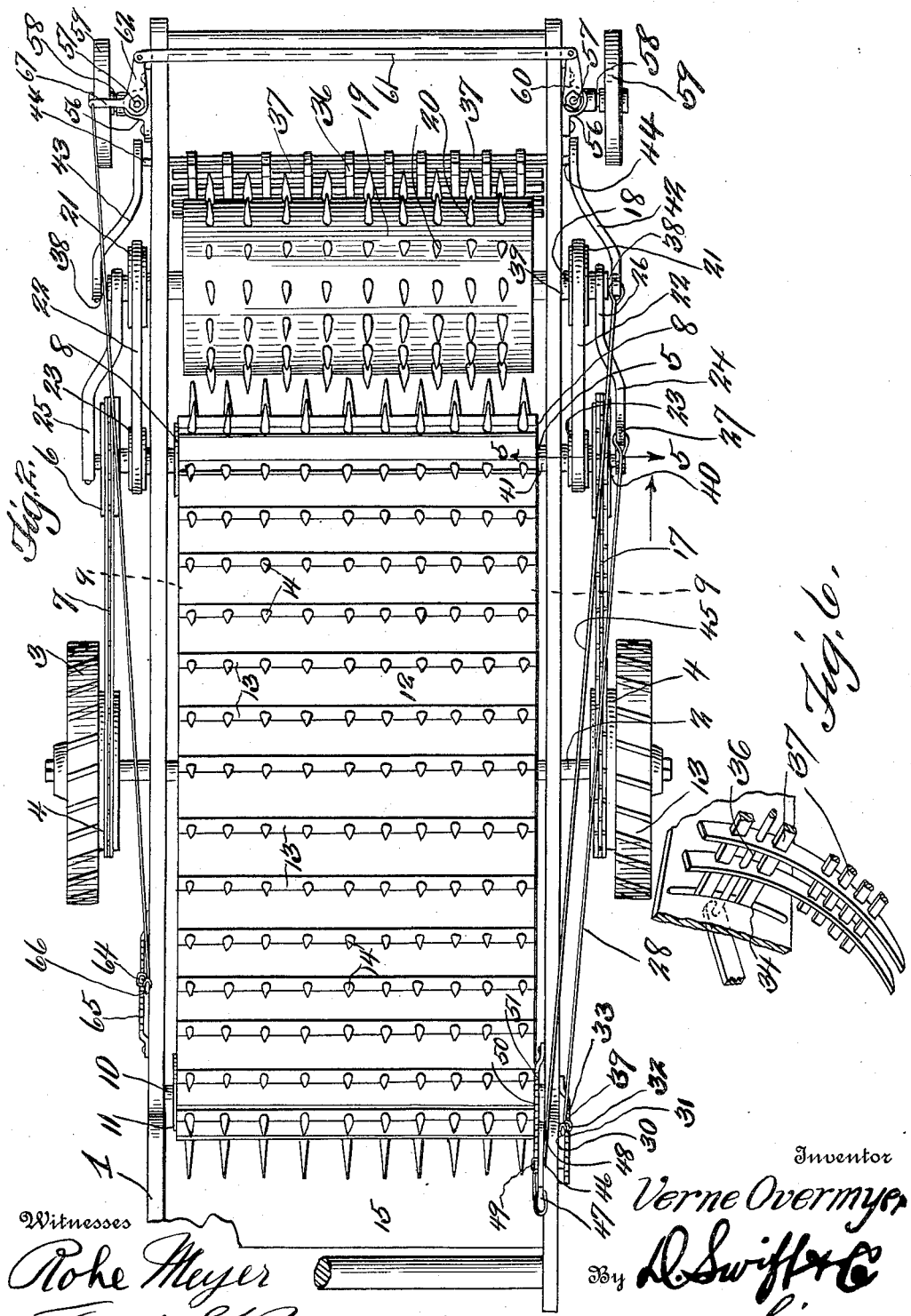
Witnesses
Rohe Meyer
Francis F. Powell
Inventor
Verne Overmyer
By D. Swift & Co.
his Attorneys V. OVERMYER.
STONE GATHERING MACHINE.
APPLICATION FILED NOV. 9, 1912.
1,057,494.
Patented Apr. 1, 1913.
3 SHEETS—SHEET 3.
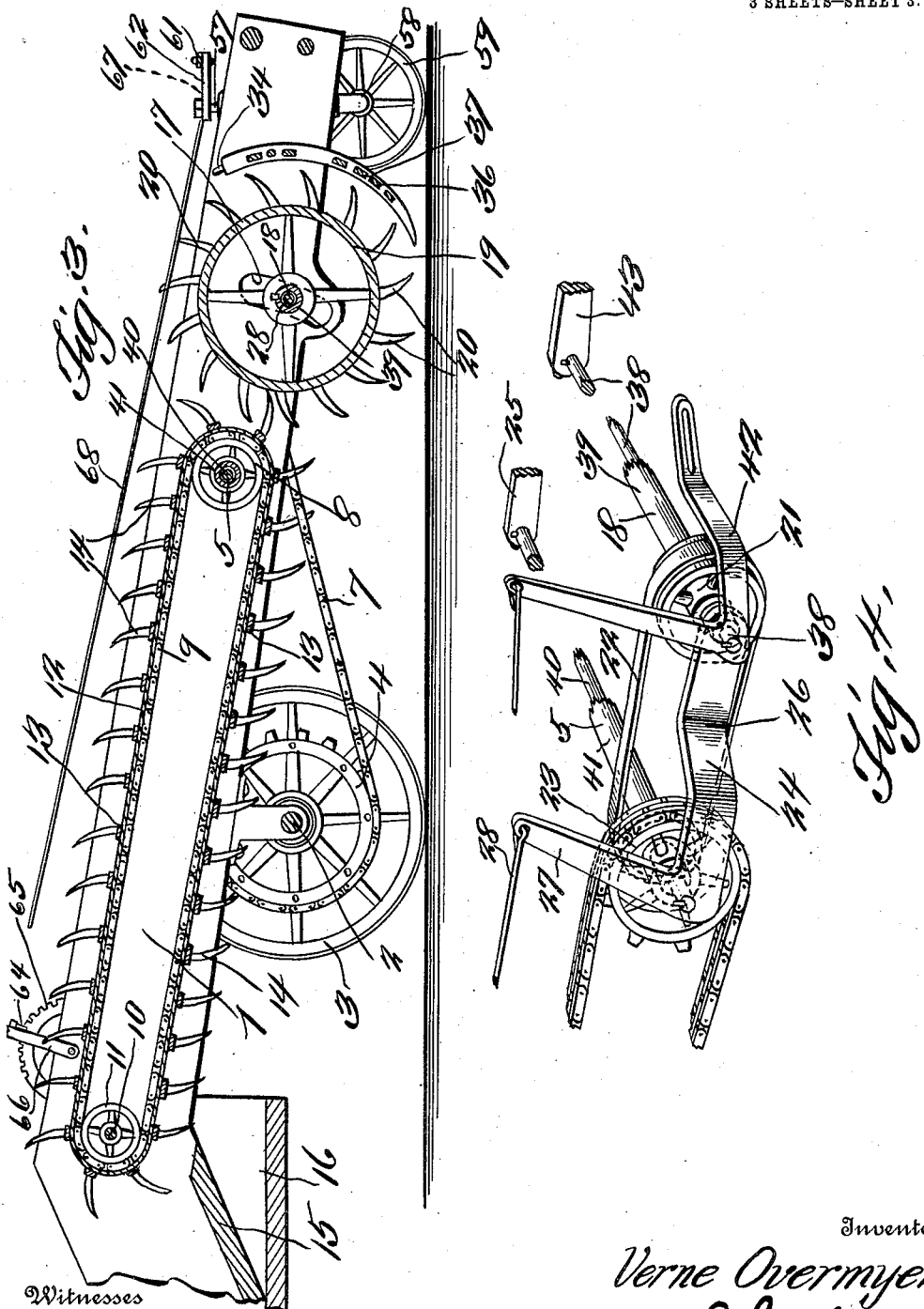
Witnesses
Rob. Meyer.
Francis G. Boswell
Inventor
Verne Overmyer
By D. Swift & Co.
his Attorneys

UNITED STATES PATENT OFFICE.

VERNE OVERMYER, OF TIOSA, INDIANA.

STONE-GATHERING MACHINE.

1,057,494.  Specification of Letters Patent.  Patented Apr. 1, 1913.

Application filed November 9, 1912. Serial No. 730,409.

*To all whom it may concern:*

Be it known that I, VERNE OVERMYER, a citizen of the United States, residing at Tiosa, in the county of Fulton and State of Indiana, have invented a new and useful Stone-Gathering Machine; and I do hereby declare the following to be a full, clear, and exact description of the invention, such as will enable others skilled in the art to which it appertains to make and use the same.

This invention relates to a new and useful stone gathering machine.

As one of the objects of the invention it is the aim to provide a simple and efficient and practical machine of this nature, in which the stone gathering roller and gathering fingers may be adjusted, in order to regulate their depth in the ground or soil.

As further stated, it is an object of the invention, to provide means for conveying the stone and the like, as they are gathered, to a wagon bed, to which the improved machine is adapted to be attached.

There are disclosed in the drawings certain features of construction, but in practical fields these features may necessitate alterations, to which the patentee is entitled, provided the alterations fall within the scope of what is claimed.

The invention comprises further features and combination of parts, as hereinafter set forth, shown in the drawings, and claimed.

In the drawings:—Figure 1 is a view in side elevation of the improved stone gathering machine, constructed in accordance with the invention. Fig. 2 is a plan view. Fig. 3 is a longitudinal sectional view. Fig. 4 is a detail view of the connections with the gathering roller and gathering fingers, for adjusting the same. Fig. 5 is a detail sectional view on line 5—5 of Fig. 2. Fig. 6 is a detail view of the frame of teeth 36.

Referring more particularly to the drawing 1 designates the frame of the machine, in bearings of which an axle 2 is journaled. Mounted upon the axle 2 are the usual wheels 3, with which the sprocket toothed rims 4 rotate. Also mounted in bearings of the frame is a shaft 5, on the ends of which sprocket wheels 6 are mounted to rotate therewith. Traveling about the sprocket wheels 6 and the toothed rims 4 are sprocket chains 7, whereby motion may be imparted to the shaft 5. Also mounted upon the shaft 5 are sprocket wheels 8, about which the chains 9 travel. Mounted in bearings of the forward end of the frame is a shaft 10 having sprocket wheels 11, about which the chains 9 travel. Secured to and movable with the chain is a conveyer apron or web 12, to which the slats 13 having long teeth 14 are secured, whereby the stones and the like, particularly stones, may be conveyed to the chute 15, from which they pass or dump into the wagon bed 16, to which the machine is adapted to be attached.

Mounted in bearings 17 of the sides of the frame is a shaft 18, upon which a rotary drum or roller 19 is fixed. This drum or roller is provided with long teeth or spurs 20, which are curved in the manner shown in the drawing, in order to efficiently gather the stones and the like. These teeth 20 are designed to intermesh with the teeth or spurs of the slats of the conveyer. Rotatable with the shaft 18 are pulleys 21, about which the belts 22 travel, which belts in turn travel about the pulleys 23 upon the shaft 5, so that when motion is imparted to the shaft 5 it will be transmitted to the shaft 18. The bearings 17 are in the form of elongated slots, curved on the arc of a circle, using the shaft 5 as a center. Movable with one end of the shaft 5 is a bell crank lever 24, while movable with the other end of the shaft 5 is an arm 25. The arm 26 of the bell crank lever 24 receives one end of the shaft 18, while the arm 25 receives the other end of said shaft, while connected to the arm 27 of the bell crank lever is a rod 28, which in turn connects at 29 to a lever 30. This lever 30 is pivoted at 31 to the frame of the machine, and is provided with a hand grip operated dog 32 to engage any one of the teeth of the rack quadrant 33, for holding the lever 30 in adjusted positions. When it is desired to raise or lower the roller 19, in order to regulate the depth of its teeth in the soil or ground, the lever 30 may be manipulated in one direction or the other.

Upon the inner faces of the side boards of the frame of the machine are guides 34, which are concentric with the circumference of the roller 19. Mounted slidably in the guides is a frame of rake or gathering fingers 36, which are braced relatively to one another by the bars 37. The shaft 18 is constructed of an inner rod section 38 and an outer sleeve or tube section 39, while the shaft 5 is similarly constructed of inner and outer sections 40 and 41. The bell crank lever 24 and the arm 25 move with the section 40, while the sprockets 8 and 6 and the pulleys 23 move or rotate with the section 41. The roller 19 moves with the section 39 of the shaft 18, and mounted on one end of the section 38 of the shaft 18 is a bell crank lever 42, while upon the other end of the section 38 is an arm 43. One arm of the bell crank lever 42 and the arm 43 are in turn connected at 44 to the frame of the gathering fingers 36. Connected to the bell crank lever 42 is a rod 45, which in turn is pivoted at 46 to the lever 47. This lever 47 is pivoted at 48 to one side of the frame of the machine, and is provided with a hand grip actuated dog 49 to engage any one of the teeth 50 of the rack quadrant 51. By rocking the lever 47 in one direction or the other, the bell crank lever 42 will be rocked upon its pivot, and by reason of the fact that the bell crank lever 42 and the arm 43 move with the section 38 of the shaft 18, the frame of gathering fingers 36 will be raised or lowered, in order to regulate their depth in the soil or ground. However, the gathering fingers and the roller are designed to be approximately adjusted simultaneously, owing to the fact that when the roller 19 is adjusted, the gathering fingers may be slightly moved, on account of the connection between the same and the sections of the shaft 18.

The rear end of the frame is provided with brackets 56, in which the rods 57 having lateral portions 58 provided with wheels 59 are journaled. The rods 57 are provided with connections 60, 61, and 62, whereby as one rod is rocked, the other is rocked in unison. A lever having the usual dog 64 to engage a quadrant 65 is pivoted to the forward end of the frame, and connecting between said lever 66 and an arm 67 of one of the rods 57 is a rod 68. By the manipulation of the lever 66 the rear wheels may be turned as desired, whereby the machine may make short turns.

In gathering stones, the machine is traversed over a field, the roller or drum 19 is rotated, motion being imparted to the frame from the wheels 3. As the roller or drum 19 revolves, the teeth thereon gather the stones against the frame of teeth 36, after which the stones are deposited upon the conveyer or apron, which in turn conveys the same to the wagon bed.

The invention having been set forth, what is claimed as new and useful is:—

1. In a stone gathering machine, a frame, a conveyer mounted therein, means for driving the conveyer, a revoluble stone gathering roller mounted to move vertically in said frame, a frame of stone gathering fingers curved concentric with the roller, guides for said frame of fingers, and correspondingly constructed means for raising and lowering the gathering roller and the fingers.

2. In a stone gathering machine, a frame, a conveyer mechanism having teeth mounted in the frame and including a shaft comprising an inner and outer section, a second shaft comprising an inner and outer section mounted in said frame, a stone gathering roller movable with the outer section of the second shaft, slots in which said second shaft is vertically movable, devices movable with the inner section of the first shaft and having loose connections with the second shaft, and means for operating said devices whereby the roller may be raised or lowered in said slot.

3. In a stone gathering machine, a frame, a conveyer mechanism having teeth mounted in the frame and including a shaft comprising an inner and outer section, a second shaft comprising an inner and outer section mounted in said frame, a stone gathering roller movable with the outer section of the second shaft, slots in which said second shaft is vertically movable, devices movable with the inner section of the first shaft and having loose connections with the second shaft, and means for operating said devices whereby the roller may be raised or lowered in said slot, and an adjustable frame of stone gathering fingers, against which the stones are gathered by the roller.

4. In a stone gathering machine, a frame, a conveyer mechanism having teeth mounted in the frame and including a shaft comprising an inner and outer section, a second shaft comprising an inner and outer section mounted in said frame, a stone gathering roller movable with the outer section of the second shaft, slots in which said second shaft is vertically movable, devices movable with the inner section of the first shaft and having loose connections with the second shaft, and means for operating said devices whereby the roller may be raised or lowered in said slot, the frame having guides curved concentric with said roller, a frame of stone gathering fingers vertically adjustable in said guides, connections between the inner section of the second shaft and said fingers, whereby the fingers may be raised and lowered when the inner section of the second shaft is rocked, means for rocking the inner section of the second shaft, and teeth carried by the roller for intermeshing with the teeth of the conveyer.

In testimony whereof I have signed my name to this specification in the presence of two subscribing witnesses.

VERNE OVERMYER.

Witnesses:
   EDGAR E. MOUNTJOY,
   HOWARD W. DuBois.

Copies of this patent may be obtained for five cents each, by addressing the "Commissioner of Patents, Washington, D. C."